United States Patent
Macaulay (10) Patent No.: US 8,369,530 B2
(45) Date of Patent: Feb. 5, 2013

(54) NETWORK SET-UP DEVICE

(75) Inventor: Robert Macaulay, Cambridge (GB)

(73) Assignee: GS IP, Limited Liability Company, Wilmington, DE (US)

( * ) Notice: Subject to any disclaimer, the term of this patent is extended or adjusted under 35 U.S.C. 154(b) by 943 days.

(21) Appl. No.: 11/937,228

(22) Filed: Nov. 8, 2007

(65) Prior Publication Data

US 2008/0199013 A1      Aug. 21, 2008

(30) Foreign Application Priority Data

Nov. 13, 2006   (GB) .................................. 0622623.7

(51) Int. Cl.
*H04L 9/08* (2006.01)
(52) U.S. Cl. .......... 380/283; 380/270; 380/277; 380/44; 713/165; 713/166; 713/167; 726/3
(58) Field of Classification Search .......... 713/165–167; 380/270, 283; 726/3
See application file for complete search history.

(56) References Cited

U.S. PATENT DOCUMENTS

| | | | | |
|---|---|---|---|---|
| 6,005,942 | A * | 12/1999 | Chan et al. .................... | 713/187 |
| 7,103,772 | B2 * | 9/2006 | Jorgensen et al. ............ | 713/168 |
| 7,552,322 | B2 * | 6/2009 | Balfanz et al. ................ | 713/159 |
| 2004/0148502 | A1 * | 7/2004 | Gollner et al. ................ | 713/167 |
| 2006/0208066 | A1 | 9/2006 | Finn | |
| 2007/0106895 | A1 * | 5/2007 | Huang et al. .................. | 713/170 |
| 2007/0258595 | A1 * | 11/2007 | Choy ............................ | 380/278 |
| 2008/0209214 | A1 * | 8/2008 | Schrijen et al. ............... | 713/169 |

FOREIGN PATENT DOCUMENTS

| | | |
|---|---|---|
| EP | 0892519 A2 * | 7/1998 |
| EP | 1701478 A | 9/2006 |
| WO | 02/069118 | 9/2002 |

OTHER PUBLICATIONS

Invitation to Pay Additional Fees and Partial International Search Report for related PCT/GB2007/004224, filed Nov. 11, 2007.
English Abstract of cited EP1701478, filed Sep. 13, 2006.
Koutroubinas S et al. "Enhancing Security in Wireless Networks" Consumer Electronics, 2004 IEEE, International Symposium on Reading, UK, Sep. 1-3, 2004, and Piscataway, NJ, USA, IEEE, Sep. 1, 2004, pp. 214-218, Sections III and V.
AVM AVM: WLAN-Router, May 9, 2005 (Retrieved from the Internet on Apr. 19, 2006).
Machine-only English translation of cited EP 1701478 A, filed Sep. 13, 2006.

* cited by examiner

Primary Examiner — Kambiz Zand
Assistant Examiner — Tongoc Tran (57) ABSTRACT

A network device adapted to communicate with other devices over a network, the device being arranged to, when the device is connected to a physical data carrier, automatically store a representation of a security key on the data carrier, and to provide at least one service over the network only to other devices making use of the security key.

34 Claims, 4 Drawing Sheets

NETWORK SET-UP DEVICE

CROSS-REFERENCE TO RELATED APPLICATION

This patent application claims priority to Great Britain Patent Application No. 0622623.7, entitled "NETWORK SET-UP DEVICE", filed Nov. 13, 2006, which is incorporated herein by reference.

BACKGROUND

There are three main types of wireless network: wireless local area networks (WLAN), wireless personal area networks (WPAN) and wireless wide area networks (WWAN). A WWAN can have a range of up to 20 miles and offers users a way to access data while away from home, the office or public access facilities. A WWAN transmits data over a mobile phone network. A WPAN is implemented by wireless PAN devices communicating with each other over a wireless connection. Such devices typically have a range of up to 160 feet and may include Bluetooth™ devices such as mobile telephones, laptops and handheld devices. A WLAN has a range of up to 300 feet, and is commonly used in homes and offices and to provide general public access facilities.

A typical WLAN is implemented by using an access point to transmit data between the devices connected to the network. An access point is a radio communications device that connects wireless clients. A typical access point allows wireless clients to access a single wireless network. The access point function may be incorporated into a router. A router transfers packets between networks and can therefore be used to connect a wireless network to a wired network such as a local area network or the internet. Incorporating the access point function into a router therefore provides the advantages of enabling clients in a wireless network to access a number of other networks.

A wireless client may be any device that is capable of transmitting data over wireless connections. Commonly a wireless network may connect various computerized devices, such as workstations, laptop computers, printers, and PDAs, to name a few. A device need not be inherently a wireless device to be connected to a wireless network as wireless network adaptors can be connected to non-wireless devices (such as printers) to enable them to be connected to the network.

In a typical wireless network, a device has to demonstrate that it knows certain security information before it can communicate over the network. One commonly used piece of information is the service set identifier (SSID), which is the name of a particular wireless network. An SSID is typically a 32-bit, case sensitive code. Devices in a wireless network may be required to employ the appropriate SSID in order to communicate with each other over the network. Typically, the SSID is attached to all packets transmitted over the wireless network to identify each packet as part of the network. The SSID therefore functions to identify each packet and to uniquely identify a group of wireless network devices in a given service set.

As an additional security measure, devices may also be required to encrypt data using a private key. If a device does not know the private key, it cannot correctly encrypt and decrypt data and so is unable to communicate with other wireless devices over the network. A private key is typically a 63-bit code. Such codes are used, for example, in wireless networks that employ wireless encryption (WEP) or Wi-Fi Protected Access (WPA) for protection.

The SSID and any private key therefore need to be known by all devices that wish to communicate over the wireless network.

The SSID can be set manually by entering the SSID into each device or automatically by leaving the SSID unspecified. Some access points broadcast the SSID so that it is communicated to all wireless devices within range. This is not a preferred method of communicating the SSID for security reasons. Broadcasting the SSID makes it available to any rogue device within range of the broadcast. However, even if for security reasons the SSID is not broadcast by the access point it can still possible for rogue devices to obtain the SSID by "snooping". For this reason, it can be advantageous to apply extra security, for example by utilizing a private key, so that even if a rogue device obtains the SSID it is not necessarily able to join the network.

Since the purpose of the private key is to improve security over a wireless network, it should not be broadcast freely to any devices within range. One option is to enter the key manually into all devices that are to form part of the wireless network. This has the disadvantage of being time consuming and potentially inaccurate. A private key can typically be up to 63 characters long and a user will commonly make mistakes while typing such a large number of characters into a device. The user also has to keep a record of the private key, which may be lost, making it impossible to connect new devices to the network using the original private key.

SUMMARY OF THE DISCLOSURE

According to a first aspect of this disclosure, there is provided a network device arranged to communicate with other devices over a network, the device being arranged to, when the device is connected to a physical data carrier, automatically store a representation of a security key on the data carrier and provide at least one service over the network only to other devices making use of the security key (e.g., after the representation of the security key has been stored).

The network device may be arranged to generate the representation of the security key. The network device may be arranged to generate the representation of the security key such that it can be identified by the other devices as representing a security key and/or such that the security key can be generated by the other devices from the representation of the security key.

The network device may be arranged to generate the representation of the security key by changing the format of the security key from a first format to a second format. The network device may be arranged to generate the representation of the security key by attaching at least one identifier to the security key. The network device may be arranged to generate the representation of the security key by converting the security key into XML format.

The network device may be arranged to obtain the security key and, after the security key has been obtained, automatically generate the representation of the security key.

The network device may comprise a data generator capable of generating the security key, the network device being arranged to generate the security key via the data generator.

The network device may comprise a user input device, the network device being arranged to, when the user input device is activated for a first length of time, generate a security key by means of the data generator. The network device may be arranged to, when the user input device is activated for a second length of time, automatically store a representation of a generated security key on the physical data carrier.

The network device may comprise a user interface, the network device being arranged to obtain the security key from data entered via the user interface.

The network device may be an access point for a wireless network.

According to a second aspect of this disclosure, there is provided a network arranged to communicate with other devices over a network, the device being capable of obtaining at least one service over the network by making use of a stored security key, and being arranged to, when the device is connected to a physical data carrier, automatically generate a security key from a representation of the security key stored on the physical data carrier and store the generated security key as the security key to be used in obtaining the at least one service.

The network device may be arranged to communicate over the network in dependence on the security key. The network device may be capable of transmitting data packets over the network and arranged to include the security key in data packets transmitted over the network. The network device may be capable of encrypting data to be transmitted over the network and arranged to encrypt data to be transmitted over the network using the security key. The network device may be capable of decrypting data received over the network and arranged to decrypt data received over the network using the security key.

The network device may comprise a connector for forming a physical connection with the physical data carrier.

According to a third aspect of this disclosure, a method is provided, the method including communicating data between at least two network devices over a network, automatically storing a representation of a security key on a physical data carrier when one of the devices is connected to the physical data carrier, and, at least after that storing step, providing at least one service over the network only to others of the devices making use of the security key.

The method may comprise connecting the physical data carrier to one of the others of the devices.

The method may comprise automatically generating the security key from the representation of the security key stored on the data carrier.

The method may comprise storing the generated security key as a security key to be used in obtaining at least one service over the network.

According to a fourth aspect of this disclosure, a method is provided, the method including communicating data between at least two network devices over a network, wherein the network devices are capable of obtaining at least one service over the network by making use of a stored security key, automatically generating a security key from a representation of a security key stored on a physical data carrier when one of the devices is connected to the physical data carrier, and storing the generated security key as the security key to be made use of in obtaining the at least one service.

The security key may comprise a network identifier, a service set identifier or a private key.

BRIEF DESCRIPTION OF THE DRAWINGS

Embodiments of this disclosure will now be described by way of example, with reference to the accompanying drawings, in which.

DETAILED DESCRIPTION

Figure 1:
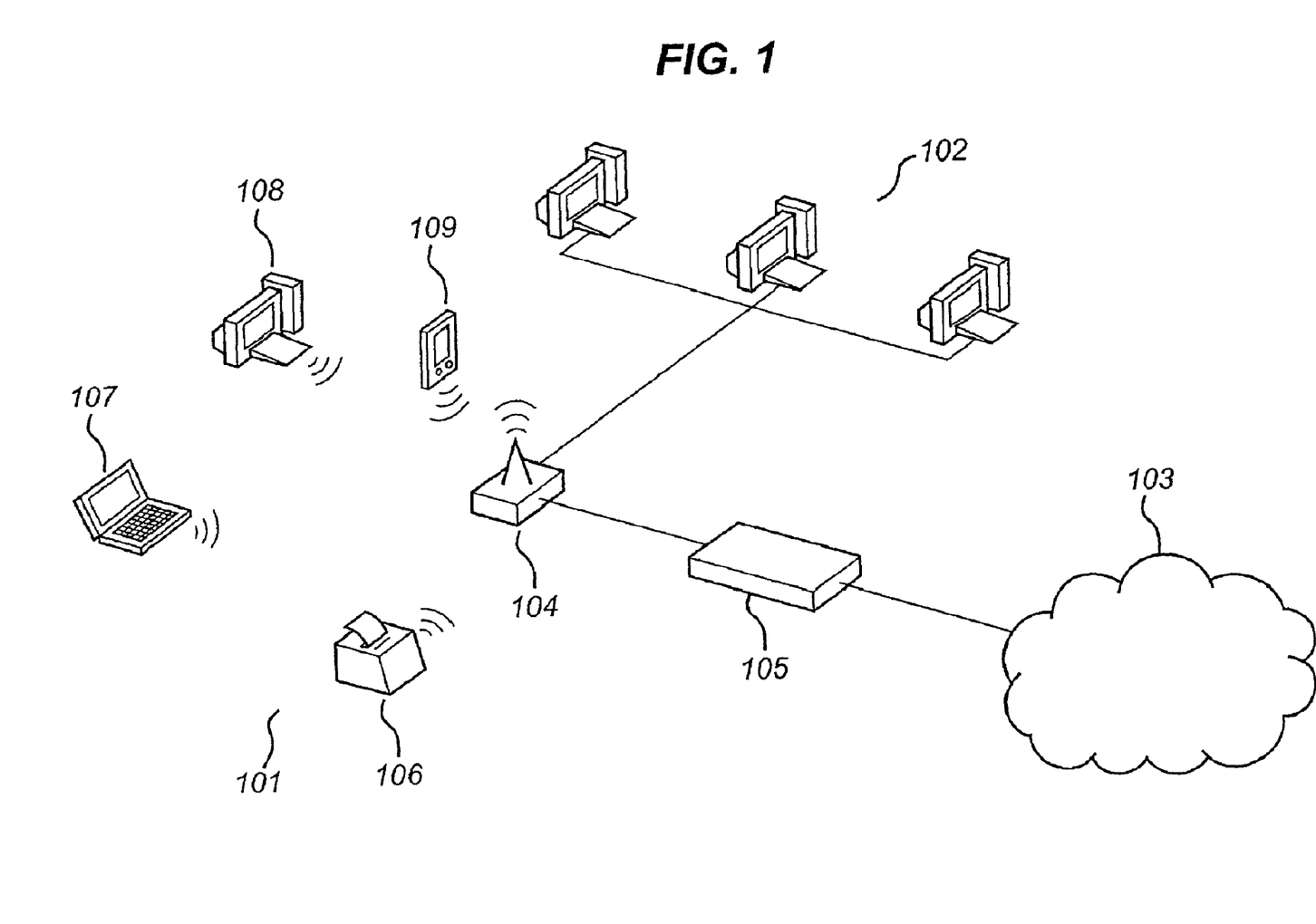
FIG. 1 shows a typical wireless network.

FIG. 1 shows a typical wireless network. The wireless network is shown generally at 101 and comprises a plurality of different devices that are arranged to communicate over the network. FIG. 1 shows a printer 106, a laptop 107, a conventional PC 108 and a handheld device 109, such as a PDA. The wireless network is controlled by a base station 104, which could be, for example, an access point or a wireless router. The base station shown in FIG. 1 is capable of performing routing functions as it links wireless network 101 to wired network 102 and to the internet 103 via modem 105.

Every device that communicates over the wireless network has access to certain security data. Such data could include a network identifier such as an SSID, security information such as a private key and configuration data or network parameters such as frequency channels, transmit power and other functions such as request-to-send, clear-to-send and fragmentation. This data can be generally considered as a security key that enables network devices to obtain services over the network.

This disclosure relates to a network device for communication with other devices over the network. The network device may be arranged to automatically store a representation of a security key on a physical data carrier when it is connected to that data carrier. After the device has stored the representation of the security key on that data carrier, it may be arranged to provide at least one service over the network to devices making use of the security key.

The network device may be an access point, such as a wireless router or a base station, to name two.

The representation may be formed by converting the security key into some standard format that renders the security key readily identifiable to wide-range of network devices. The standard format may be a proprietary format that the network devices in the wireless network have been specifically adapted to use. Alternatively, the standard format may be one which is generally in use. For example, the representation of the security key can be the security key converted into XML format, which is a format that many devices are capable of interpreting. More generally, the representation of the security key may be formed by appending an identifier to the security key that identifies it to different network devices within a network as being a security key. This has the advantage that network devices can recognize the representation of the security key when they are connected to the data carrier and act accordingly. For example, a network device may be arranged to automatically use the representation of the security key stored on the data carrier to generate the security key, which it then makes use of to obtain at least one service over the network.

The security key may be encrypted by the network device before it is stored on the data carrier. Other network devices may be arranged to decrypt the data read from the data carrier so as to obtain the security key.

The data carrier may be a portable device so that the representation of the security key can be carried between network devices by a user. The external device may be a simple storage device, such as, for example, a memory stick, an SD card, a USB stick, to name a few.

This disclosure also relates to a network device that may be arranged to, when connected to a data carrier, automatically generate a security key from a representation of a security key stored on a data carrier. The network device may be arranged to make use of the generated security key to obtain at least one service over the network.

The network devices arranged to generate a security key from a representation of a security key may be any device that is capable of being connected to a wireless network. This includes, for example, PCs, laptops, printers, digital cameras, and PDAs, to name a few. The network device may be one that is not conventionally capable of wireless communications (e.g. a printer) but which has been adapted for wireless communications by means of a wireless adaptor. If the device incorporates a wireless adaptor, then the data carrier may be connected to the wireless adaptor rather than the device itself. The wireless adaptor could itself be considered to be a network device.

A network device arranged to store a representation of a security key on a data carrier may perform the step of storing with no input from the user. Alternatively, the storing function may be triggered by some minimal user input, such as, for example, pressing a button. Irrespective of whether or not a user input is required to trigger the storing function, this function may be performed automatically by the network device (e.g., with minimal user input). Therefore, while a user may be required to trigger the storing function, the function itself is performed independently by the device so that the user is not required to perform this step, or to understand how it works. Similarly, the step of generating the security key performed by network devices according to other embodiments may be performed with little or no user input.

The network devices described above can simplify the set-up of a network. For example, many users find setting up a wireless network difficult because of the data that has to be entered into each device in such a way that each device knows what to do with that data. The network devices described herein may address this problem, as explained below.

Firstly, a first network device is used to automatically store a representation of the security key on a data carrier. The automatic storing of this data may require either no input or only minimal input from the user. Many users would find storing a representation of a security key on a storage device complicated and confusing. Therefore, by automatically performing this function a network device can considerably simplify the task of setting up a network.

Secondly, a second network device that is to be connected to the network is arranged to automatically use the representation stored on a data carrier to generate a security key and make use of this security key to obtain a service over the network. This automatic generation function means that the user no longer has to enter the security key manually, since the network device automatically uses the representation stored on the data carrier. Also, the user does not need to enter the security key in such a way that the network device knows what to do with it. By automatically generating the security key and making use of it to obtain a service, the network device is effectively automatically recognizing the representation as representing a security key, generating the key and using it to communicate over the network. Therefore, the second network device can considerably simplify the task of connecting network devices to a network.

Each of the network devices will now be described with reference to specific implementations of these devices shown in FIGS. 2 and 3. This is for the purposes of example only, and it should be understood that the network devices are not limited to any specific implementation. In particular, in FIGS. 2 and 3 separate functional units for performing each different function are shown. However, the various operations performed by each device could be divided differently between functional units. The functional units need not be implemented in separate blocks, as shown in the figures.

Figure 2:
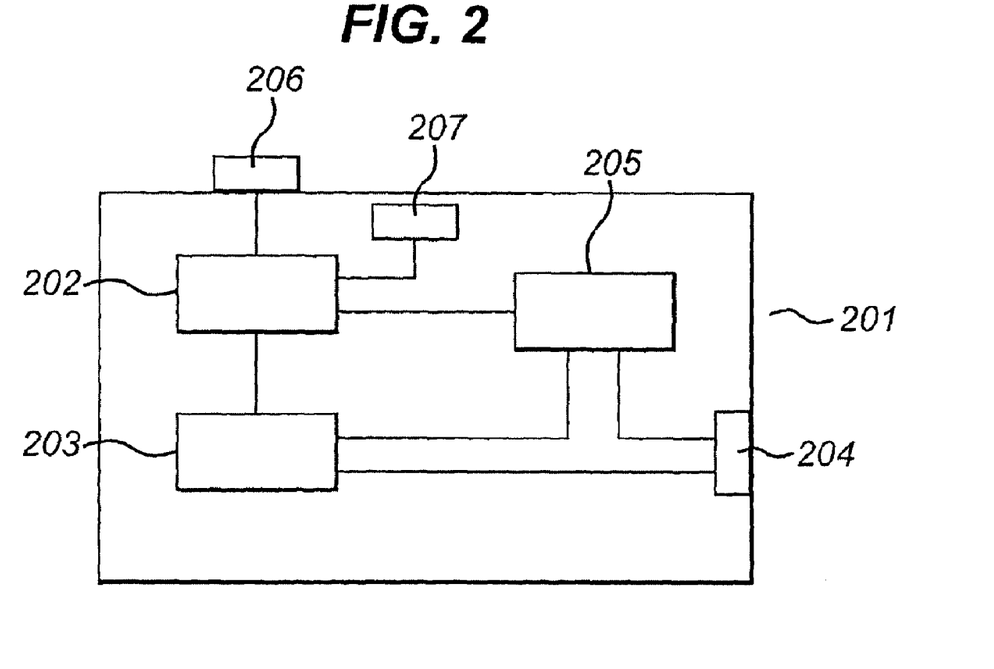
FIG. 2 shows an network device.

An example of a network device is shown in FIG. 2. The network device is shown generally at 201 and comprises a controller 202, a representation unit 203, a connector 204, a memory 205, a user interface 206 and a data generator 207.

The controller 202 is arranged to control security key operations in the network device in dependence on input data received via user interface 206. The controller could be a central controller for controlling the general operation of the apparatus. Alternatively, the controller could be specifically arranged for performing the security key functions described herein. The controller could be a microprocessor.

The controller is arranged to receive instructions from the user interface and to control operations of the representation unit, the data generator and the memory in dependence on those instructions.

The representation unit 203 is arranged to generate a representation of the security key. The representation unit may be arranged to generate the representation by converting the data passed to it by the controller into a standard format that identifies the data as being a security key. The representation unit may be a processor arranged to run appropriate software for converting the received data into the appropriate format. Alternatively, the representation unit could be implemented in hardware. For example, the representation of security key into converted data may involve appending an identifier to the security key. This is a function that could be straightforwardly achieved in hardware. For more complex implementations, in which the security key includes different types of data that need to be separately identified, a software implementation may be more appropriate.

The memory 205 is connected to both the representation unit and the controller. The memory is also connected to the connector. The memory can therefore receive a representation of a security key from the representation unit and store that representation. It can also transfer a stored representation to the connector for storing on a data carrier.

The data generator is arranged to generate security key and may be, for example, a random number generator. The data generator may pass that data to the controller (as in the arrangement shown in the figure) or may pass the generated data directly to the representation unit.

The controller, data generator and representation unit could be implemented by a single microprocessor.

The connector 204 is capable of connecting the network device to a data carrier. The connection could be achieved by means of a wireless connection; however, a physical connection may be preferred for security reasons as any wireless data transfer could be detected by rogue devices. The connection may therefore be a direct physical connection, for example, a connection that is formed by placing a plug of the data carrier into a connector/socket of the network device. The connector could be a proprietary connector, i.e. a connector specifically designed for the data carrier or a standard connector such as a standard USB connector, an SD connector, and an RJ45 connector, to name a few.

In use, the network device may be arranged so that the user can cause the network device to generate a security key and store it on a data carrier via user interface 206. The user interface may be a single user input device that can be used to trigger the generation and storing functions of the network device by activating the user input device for different lengths of time. In the example shown in FIG. 2, user interface 206 is a button. The controller 202 may be arranged to perform different operations in dependence on the length of time for which the button is pressed. For example, if the button is pressed for a relatively short time, e.g., 1 second or less, the controller may instruct the memory to transfer stored data to a data carrier via connector 204. If the button is pressed for a relatively long time, e.g., 3 seconds or longer, the controller may instruct data generator 207 to generate a new security key, which the controller then passes to representation unit 203 for conversion into a standard format. The representation unit then transfers the converted data to a data carrier via connector 204. The converted data may also be passed to memory 205 for storage. Alternatively, the network device may generate the security key and store it on the data carrier automatically when the data carrier is plugged into the network device.

Although FIG. 2 illustrates an implementation in which the network device comprises a data generator for generating the security key, the network device may also obtain the security key from some external means. For example, the user may enter the security key manually into the network device via a user interface. The user could obtain the security key by accessing a web page that provides data generation services, e.g., by using the network device if it is capable of accessing the internet or by using a conventional computer.

If the security key to be generated consists of more than one type of data (e.g. an SSID, a private key, a transmission frequency, or others), the controller may be arranged to instruct the data generator to generate each type of data. For example, the data generator may repeatedly generate random numbers to generate each of the random numbers required. For example, the data generator could first generate an SSID, followed by a private key. Some of the security data may not be generated by a data generator but be stored in the apparatus. Some data could be determined by the operational settings of the apparatus. All of the data that a device requires to communicate over the wireless network may be passed to the representation unit by the controller (or directly from memory) for formatting.

The representation unit may be arranged to format the security key so that each of the different types of data are individually identifiable to a network device. For example, the representation unit might be arranged to identify the security key as a whole as being a security key, i.e., data that permits a network device to communicate over a wireless network. The representation unit might then individually identify the data making up the security key as being, for example, an SSID, a private key, and/or a transmission frequency. This can be achieved by formatting the data using a hierarchy of identifiers. A suitable format is XML.

Figure 3:
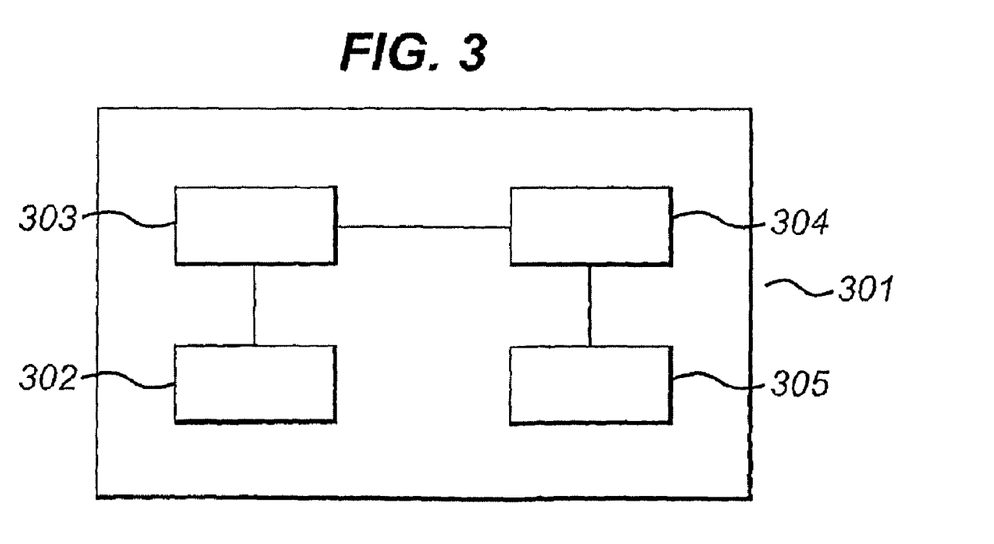
FIG. 3 shows a network device.

FIG. 3 shows a further example of a network device. The network device is shown generally at 301 in FIG. 3 and comprises a connector 302, a generation unit 303, a configuration unit 304 and a communication unit 305.

The connector 302 is for connecting the network device to a data carrier and for transferring data between the two devices. The data carrier may appear as a storage device to the network device. The user may manually instruct the network to download the data stored on the data carrier, e.g., by activating a button or other similar user-input device. Alternatively, the network device may be programmed to automatically access data stored on a storage device connected to its connection unit.

The connector passes data read from the data carrier to the generation unit 302. The generation unit may automatically recognize that the received data represents a security key, e.g., via the format in which the security key was stored on the data carrier. Alternatively, a user input that triggers the network device to retrieve the representation from the data carrier may also serve to identify the representation to the generation unit.

The generation unit is also arranged to generate the security key from the representation. The security key may be stored on the data carrier in a standard format, so that the generation unit can generate the security key by reversing the formatting operation performed by the other network device to generate the representation. This may involve simply removing identifiers from the representation so that only the security key remains.

The network device could additionally include a memory for storing the security key. For example, the security key might not be immediately required (in which case it can be stored until used) or the data might be required repeatedly (for instance an SSID that is incorporated into each data packet sent over the network) in which case it can be stored for repeated use.

The generation unit 303 is arranged to transfer the recognized security key to the configuration unit 304. The configuration unit is arranged to obtain services over the network by making use of the security key. For example, the configuration unit may be operable to configure the communication unit 305 in dependence on the security key. This might involve encrypting and decrypting data sent over the network using a private key included in the security key, transmitting data at a certain frequency defined by the security key, transmitting at a transit power defined by the security key or transmitting data packets including a network identifier included in the security key.

The network device may be arranged so that the step of configuring the communication unit is performed automatically upon identification of the security key. In this way, the input required from the user can be minimized.

Figure 4:
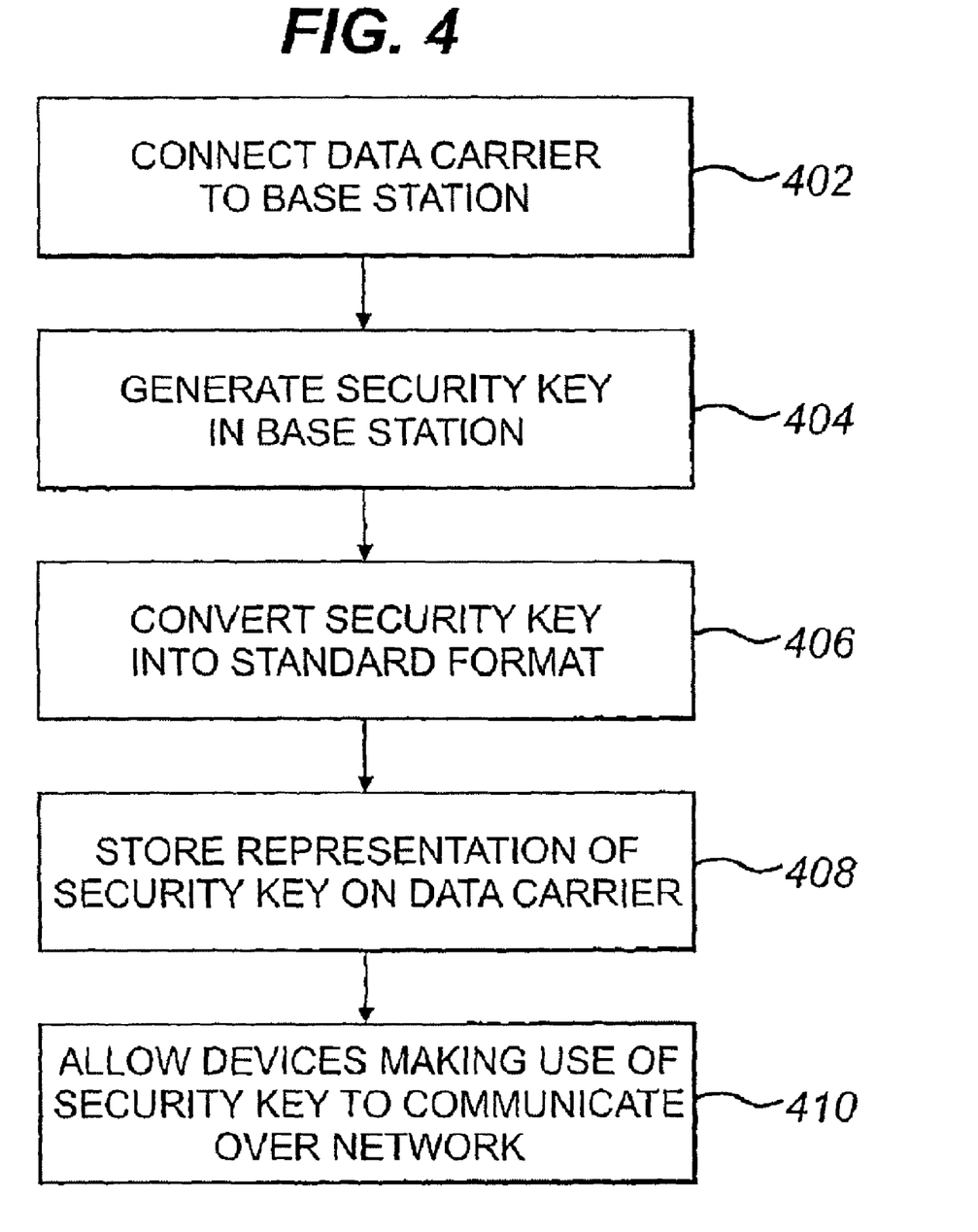
FIG. 4 shows a method of storing security key in a data carrier.
Figure 5:
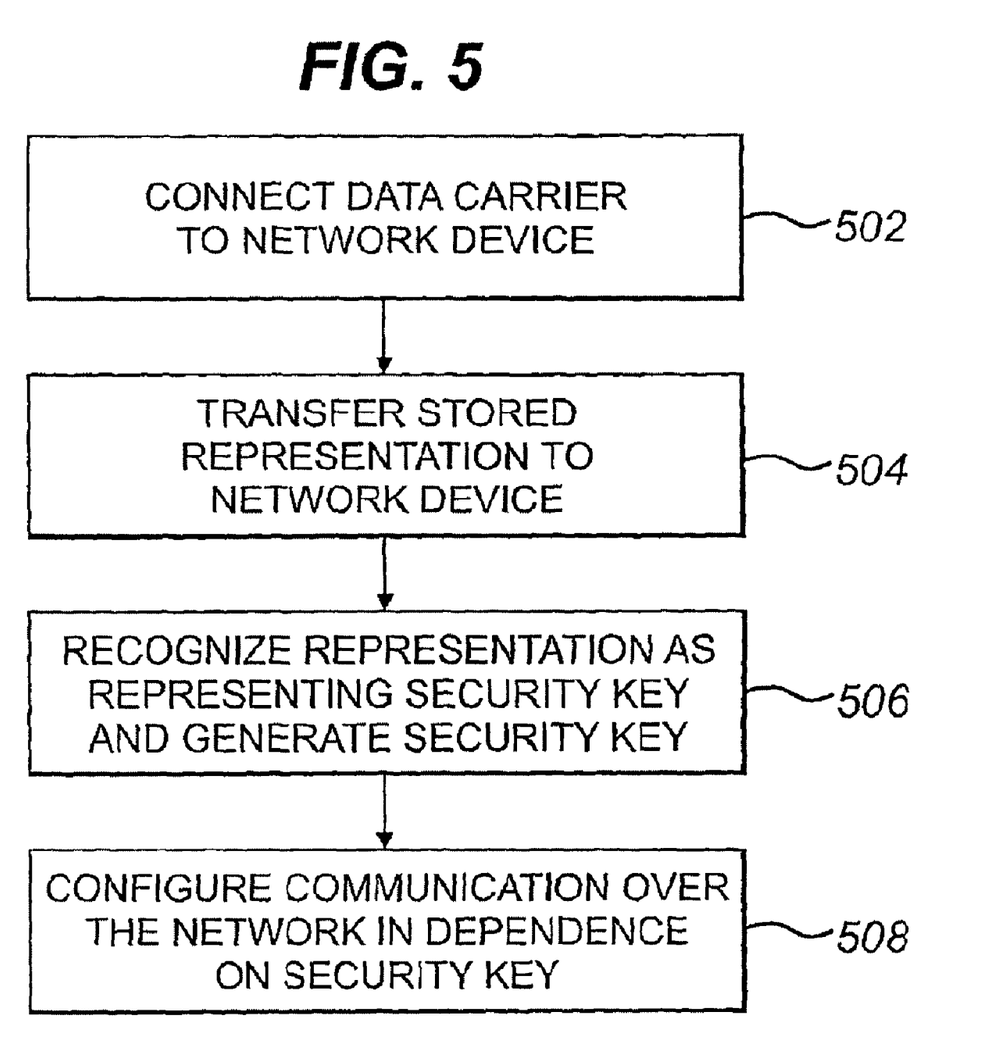
FIG. 5 shows a method of transferring security key to a network device.

FIGS. 4 and 5 illustrate the steps involved in transferring a security key between different network devices according to a specific example in which the first network device is a base station capable of generating the security key and arranged to convert the security key into a standard format for storing on a data carrier.

FIG. 4 illustrates steps that may be involved in storing security key on a data carrier. The data carrier is connected to the base station in step 402. In step 404 the security key is generated by the base station. This step could be performed before connection of the data carrier to the base station. In step 406 the network device automatically converts the security key into a format that identifies it as being security key. In step 408 the converted data is stored on the data carrier. Finally, in step 410 the base station allows devices making use of the security key to communicate over the network.

FIG. 5 illustrates steps that may be involved in transferring stored data from a data carrier to a network device. In step 502 the data carrier is connected to the network device. In step 504 the data stored on the data carrier is transferred to the network device. In step 506 the network device recognizes the security key and generates the security key from the representation and in step 508 the network device configures its communications over the network dependent on the security key.

Each of the individual feature described herein may be used in isolation or in any combination of two or more such features to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present disclosure may include any of such individual feature or combination of features. In view of the foregoing description it will be evident to a person skilled in the art that various modifications may be made within the scope of the disclosure.

What is claimed is:

1. A base station in a network comprising the base station and multiple other devices that can be configured to communicate with the base station, the base station comprising:
   a connector configured to connect to a physical data carrier, wherein the base station is configured to store a representation of a security key on the physical data carrier, and wherein the physical data carrier is readable by one or more of the multiple other devices,
   wherein the security key comprises one or more network parameters operable to set up multiple communication links between the base station and the multiple other devices over the network, wherein the security key is utilized to permit the multiple other devices to connect to the network, and
   wherein the base station is configured to communicate over the network with each of the multiple other devices that make use of the security key to access the network.

2. A base station as claimed in claim 1, wherein the base station is configured to generate the representation of the security key.

3. A base station as claimed in claim 2, wherein the base station is configured to generate the representation of the security key such that it can be identified by the multiple other devices as representing a security key.

4. A base station as claimed in claim 2, wherein the base station is configured to generate the representation of the security key such that the security key can be generated by the multiple other devices from the representation of the security key.

5. A base station as claimed in claim 2, wherein the base station is configured to generate the representation of the security key by changing a format of the security key from a first format to a second format.

6. A base station as claimed in claim 2, wherein the base station is configured to generate the representation of the security key by attaching at least one identifier to the security key.

7. A base station as claimed in claim 2, wherein the base station is configured to generate the representation of the security key by converting the security key into an XML format.

8. A base station as claimed in claim 1, wherein the base station is configured to obtain the security key and, in response to obtaining the security key, automatically generate the representation of the security key.

9. A base station as claimed in claim 1, further comprising: a data generator configured to generate the security key.

10. A base station as claimed in claim 1, further comprising: a user interface configured to receive data, the base station being configured to obtain the security key from data entered via the user interface.

11. A base station as claimed in claim 1, wherein the base station is an access point for a wireless network.

12. A network device configured to receive a representation of a security key, the security key operable to permit the network device to access a network comprising one or more other devices that also utilize the security key to access the network, the network comprising a base station, the security key comprising one or more network parameters operable to set up multiple communication links between the base station and multiple devices on the network, the network device comprising:
   a connector configured to connect to a physical data carrier, wherein the network device is configured to receive from the physical data carrier the representation of the security key and, in response to receipt of the representation of the security key, generate the security key based on the representation of the security key.

13. A network device as claimed in claim 12, wherein the network device is configured to communicate over the network in dependence on the security key.

14. A network device as claimed in claim 12, wherein the network device is capable of transmitting data packets over the network and is configured to include the security key in substantially all data packets transmitted over the network.

15. A network device as claimed in claim 12, wherein the network device is capable of encrypting data to be transmitted over the network and is configured to encrypt data to be transmitted over the network using the security key.

16. A network device as claimed in claim 12, wherein the network device is capable of decrypting data received over the network and is configured to decrypt data received over the network using the security key.

17. A method for establishing a communication link over a network including a first network device that is a base station and a second network device that each make use of a security key to permit the first and second network devices to access the network, the method comprising:
   generating a representation of a security key at the first network device, the security key operable to permit a connection to the network;
   transmitting the representation of the security key from the first network device to a physical data carrier connected to the first network device to store the representation of the security key on the physical data carrier, wherein the security key comprises one or more network parameters operable to set up multiple communication links between the base station and multiple devices on the network; and
   permitting the second network device to access the network in response to detecting that the second network device receives the representation of the security key from the physical data carrier.

18. A method as claimed in claim 17, wherein the representation of the security key is generated by converting data corresponding to the security key into a format that identifies the data as a security key.

19. A method as claimed in claim 17, further comprising: creating the security key at the first network device.

20. A method as claimed in claim 17,
   wherein the security key includes a service set identifier and a private key, and
   wherein the representation of the security key is generated by appending identifiers to the service set identifier and the private key that individually identify the service set identifier and the private key.

21. A method for enabling a network device to connect to a network, the method comprising:
   receiving at the network device a representation of a security key stored on a physical data carrier connected to the network device, wherein the network comprises a base station and the security key comprises one or more network parameters operable to set up multiple communication links between the base station and multiple devices on the network;
   generating the security key from the representation received at the network device; and
   storing the generated security key at the network device to enable the network device to communicate over the network with other devices that each make use of the security key to connect to the network.

22. A method as claimed in claim 21, further comprising: automatically configuring network configuration settings of the network device in response to the generating of the security key.

23. A method as claimed in claim 21, further comprising: recognizing with the network device, the received representation as a security key representation.

24. A method as claimed in claim 21,
wherein the representation of the security key is formed using a formatting operation on the security key, and
wherein the network device automatically generates the security key from the representation by reversing the formatting operation.

25. A system comprising:
means for communicating data between first and second network devices over a network, wherein the first network device is a base station;
means for generating a representation of a security key at the first network device, the security key being used to access the network, the security key comprising one or more network parameters operable to set up multiple communication links between the base station and multiple devices on the network;
means for connecting the first network device to a physical data carrier;
means for transmitting the representation of the security key from the first network device to the physical data carrier; and
means for providing the second network device access to the network in response to detecting that the second network device receives the representation of the security key from the physical data carrier.

26. A network device configured to convey a security key, the network device comprising:
a representation unit configured to generate a representation of a security key, the security key operable to permit a communication link over a network comprising one or more other devices that utilize the security key, the network comprising a base station, the security key comprising one or more network parameters operable to set up multiple communication links between the base station and multiple devices on the network; and
a connector configured to connect the network device to a physical data carrier operable to store and communicate the representation of the security key to the one or more other devices.

27. A network device as claimed in claim 26, further comprising: a security key data unit configured to generate the security key.

28. A network device as claimed in claim 26, further comprising: an interface configured to receive the security key and in response to receiving the security key, convey it to the representation unit that generates the representation of the security key.

29. A method as claimed in claim 17, wherein the security key provides a wireless authentication scheme.

30. A base station as claimed in claim 1, wherein the one or more network parameters comprise one or more of a network identifier, frequency channel and transmit power level.

31. A network device as claimed in claim 12, wherein the security key comprises one or more of a network identifier, frequency channel and transmit power level.

32. A method as claimed in claim 17, wherein the security key comprises one or more of a network identifier, frequency channel and transmit power level.

33. A method as claimed in claim 21, wherein the security key comprises one or more of a network identifier, frequency channel and transmit power level.

34. A network device as claimed in claim 12, wherein the network device is configured to store the security key.

* * * * *